United States Patent
Moulin

[11] Patent Number: 5,955,982
[45] Date of Patent: Sep. 21, 1999

[54] METHOD AND DEVICE FOR DETECTING AND LOCATING PEOPLE BURIED E. G. UNDER AN AVALANCHE

[75] Inventor: Jean Marc Moulin, Lans en Vercors, France

[73] Assignee: Option Industries, France

[21] Appl. No.: 09/019,739

[22] Filed: Feb. 6, 1998

[30] Foreign Application Priority Data

Feb. 6, 1997 [FR] France .................................. 97 01464

[51] Int. Cl.$^6$ .................................................. G01S 1/08
[52] U.S. Cl. ............................................. 342/22; 342/146
[58] Field of Search ........................... 342/22, 146, 419; 340/573, 539

[56] References Cited

U.S. PATENT DOCUMENTS

| | | | |
|---|---|---|---|
| 4,045,799 | 8/1977 | Dapiran | 342/419 |
| 4,314,240 | 2/1982 | Schnug | 340/573 |
| 4,331,957 | 5/1982 | Enander et al. | 342/22 |
| 4,850,031 | 7/1989 | Allsop et al. | . |
| 5,172,110 | 12/1992 | Tiefengraber | 342/22 |
| 5,790,032 | 8/1998 | Schmidt | 342/28 |

FOREIGN PATENT DOCUMENTS

| | | |
|---|---|---|
| 2644700 | 9/1990 | France . |
| 3046895 | 6/1982 | Germany . |
| 3248950 | 11/1983 | Germany . |

OTHER PUBLICATIONS

Lamberton, M. "Emetteur–Recepteur de Secours Contre Les Avalanches" Electronique Radio Plans. No. 567, 1st Feb. 1994, pp. 29–34 XP000494705.

Primary Examiner—Daniel T. Pihulic
Attorney, Agent, or Firm—William A. Drucker

[57] ABSTRACT

To search for an avalanche victim wearing a radio transmitter continually transmitting at a standardized frequency, the method according to the invention comprises: a victim detection phase during which a rescue worker wearing a receiver methodically covers the zone snowed in by the avalanche during which time the receiver detects the moments when the amplitude of the signal received is greater than a lower threshold, a phase of directional search for the victim during which the rescue worker rotates with the receiver while the latter detects the moments when the amplitude of the signal received is at the maximum, and signals these moments to the rescue worker who is then pointed towards the victim, a phase during which the rescue worker advances towards the victim, during which the receiver checks that the amplitude of the signal remains at the maximum, and detects the moments when the amplitude of the signal received exceeds an upper threshold.

20 Claims, 4 Drawing Sheets

METHOD AND DEVICE FOR DETECTING AND LOCATING PEOPLE BURIED E. G. UNDER AN AVALANCHE

BACKGROUND OF THE INVENTION

1. Field of the Invention

The invention relates to a method and device for detecting and locating avalanche victims.

2. Description of the Prior Art

At present, devices of this type comprise an individual and autonomous radio transceiver to be carried or worn by each person exposed to the risk of being an avalanche victim. This transceiver transmits a signal in the form of electromagnetic waves at a standardized frequency capable of propagating through a layer of snow.

When an avalanche occurs, the people carrying or wearing the device can seek out and locate the avalanche victims themselves by way of the device's receiver function. It so happens that the survival of avalanche victims depends on the speed at which they are detected and located.

Searching for victims consists in methodically covering the zone snowed in by the avalanche, criss-crossing with passes 20 meters apart, listening for audible bleeps corresponding to the signal received by the receiver and transmitted by the device worn by the victim, and in heading in the direction in which the bleeps are of greatest amplitude.

Devices of this type also comprise a gain selector used to lower the noise level of the bleeps, thus enabling more accurate location of victims.

Experience has shown that the utilization of all existing devices requires serious training in order to obtain a good grasp of the victim search technique, as well as a minimum of concentration and an environment that is not noisy. However, after an avalanche, rescue workers, who usually belong to the same group as the victim(s), are panic-stricken and have difficulty concentrating for the purposes of accurately and methodically covering the search zone, perceiving variations in the amplitude of the bleeps and manipulating the gain selector, the latter being a difficult task to perform as rescue workers usually wear gloves to protect themselves against the cold.

In an endeavor to facilitate the search operation, it has already been proposed that a display be added to the device to make it easier to detect the maximum signal.

OBJECT OF THE INVENTION

The main object of this invention is to remedy the preceding disadvantages, particularly to guide rescue workers through each of the search phases by directly indicating to them what operations must be performed.

SUMMARY OF THE INVENTION

Accordingly, there is provided a method for guiding a rescue worker, carrying a radio receiver device at a standardized frequency, throughout the search for an avalanche victim wearing a radio transmitter device permanently transmitting a signal at the standardized frequency.

According to the invention, this method is characterized in that it comprises the following successive phases:

a phase consisting in detecting the presence of the transmitter device worn by the victim, during which the rescue worker methodically covers the zone snowed in by the avalanche, this phase comprising the comparing of the amplitude of the signal received by the receiver with a lower threshold, and the controlling of a first signaling means to indicate to the rescue worker whether or not the signal received exceeds the low threshold, a phase consisting of a directional searching for the victim, during which the rescue worker rotates the receiver device about a vertical axis, this phase including the detection of the instants at which the signal received reaches a maximum amplitude value, and the controlling of a second signaling means to indicate to the rescue worker whether or not the amplitude of the signal received is at a maximum value in order to let the rescue worker know if he is headed in the direction of the victim, a phase consisting in the rescue worker advancing towards the victim, comprising the detection of the instants at which the amplitude of the signal received reaches a maximum value, the controlling of the second signaling means, the comparing of the amplitude of the signal received with an upper threshold, and the controlling of a third signaling means to tell the rescue worker whether or not the signal received exceeds the upper threshold.

By way of these arrangements, the rescue worker is guided directly to the victim by detection of the maximum field patterns. The method according to the invention thus enables a considerable amount of time to be saved in the search for victims, and this is essential given the fact that the likelihood of survival of a person buried under an avalanche decreases exponentially over time.

Furthermore, the signals sent to the rescue worker by the receiver device can be used directly insofar as they do not require human interpretation. The invention thus also eliminates any errors in interpreting the signals received and considerably simplifies the utilization of devices of this type, especially by releasing the rescue worker from the task of manipulating the gain selector.

According to one feature of the invention, the phase consisting in detecting the presence of a victim is following by a learning and synchronization phase during which the receiver synchronizes itself with the signal received and determines a periodic time window during which this signal is received, the subsequent phases only taking measurements during this periodic time window.

Thus, the search for a victim is not interfered with by the signals transmitted by the transmitters of other victims.

Advantageously, during the victim search phases, the method according to the invention further comprises the conversion of the amplitude of the signal received into a distance corresponding to the distance between the rescue worker and the victim, as well as the displaying of this distance.

According to another feature of the invention, this method further comprises the determining of the direction in which the receiver device is to be rotated during the directional search phase, and the advancing phase, as well as the indication of the direction of rotation to the rescue worker. Thus, the rescue worker is informed as to the direction in which the receiver device must be turned in order to be pointed in the direction of the transmitter device worn by the victim.

As previously mentioned, the invention also relates to a device for the implementation of the method according to the invention.

BRIEF DESCRIPTION OF THE DRAWINGS

Further features and advantages of the invention will be apparent from an embodiment of the method according to the invention described, by way of a non-limiting example, in reference to the corresponding accompanying drawings in which.

DESCRIPTION OF THE PREFERRED EMBODIMENTS

The method according to the invention is implemented e.g. by a device comprising a transmitter and a receiver, operating at a standardized frequency of 457 kHz. This device is designed to be worn by people exposed to the risk of being buried under an avalanche, and by people rescuing avalanche victims.

Figure 1:
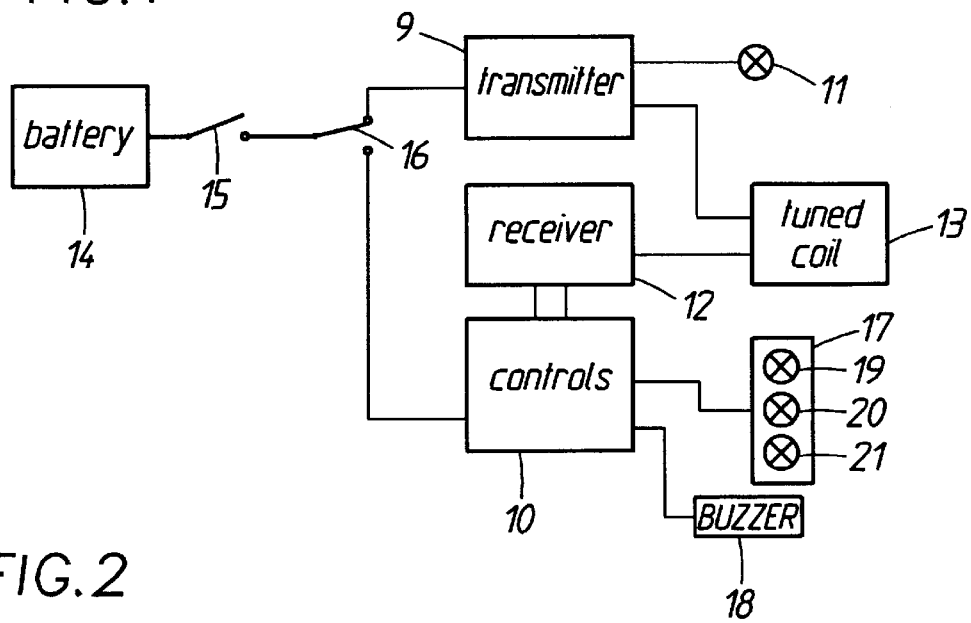
FIG. 1 schematically represents a synopsis diagram of a device enabling the method according to the invention to be implemented.

An example of this device is represented in FIG. 1. In this figure, the device comprises, in a known manner, a transmitter module 9 and a receiver module 12 connected to a coil 13 tuned to the frequency used by the modules 9 and 12, i.e. 457 kHz for instance. According to the invention, the device further comprises a control module 10 receiving the signal received by the receiver and controlling the latter, as well as an audible signaling means 18, e.g. comprised of a vibrator, and an optical signaling means 17 comprising e.g. indicator lamps 19, 20, 21 and/or a luminous bar graph and/or a digital display with twice seven segments. These three modules 9, 10, 12 are powered by a source of energy 14 which can e.g. be comprised of a battery, via an ON/OFF switch 15, the power terminals of the transmitter and receiver modules 9 and 12 being connected to the switch 15 via a transmission or reception selector 16 enabling activation either of the transmitter module 9, in order to permanently transmit a signal when the user crosses a zone in which an avalanche can occur, or of the receiver module 12 in order to search for avalanche victims.

The transmitter module 9, which is of known structure, is connected to an indicator lamp 11 enabling the user to be informed that the device is in the transmission mode. It comprises a radio transmitter transmitting electromagnetic waves at a standardized frequency of 457 kHz, this frequency being modulated by a pulsed signal comprised of pulses e.g. lasting 70 milliseconds and spaced one second apart.

Figure 2:
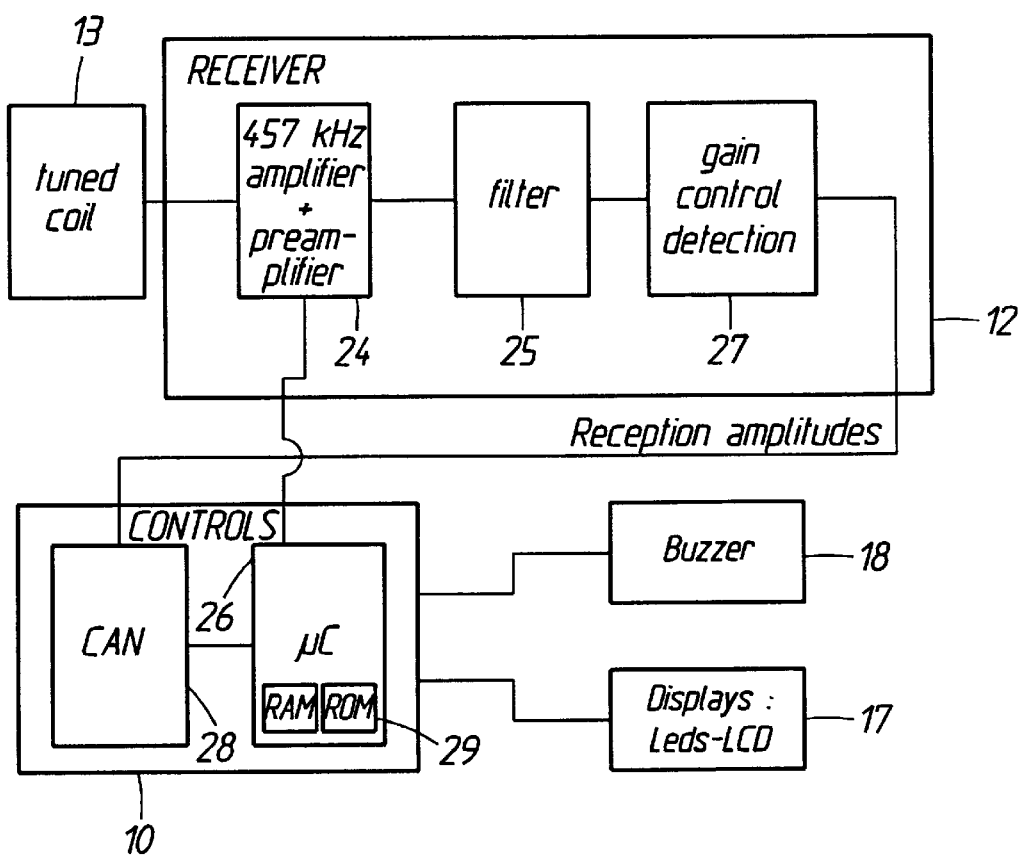
FIG. 2 shows, in greater detail, part of the device represented in FIG, 1.

FIG. 2 shows greater details of the receiver module 12 and control module 10. The receiver module includes a preamplification and amplification stage 24 connected to the tuned coil 13, a bandpass filtering means 25 centered on the 457-kHz standardized frequency connected to the output of the stage 24, and a signal detection and gain control circuit 27 applied to the amplitude of the signal coming from the filtering means 25. This circuit 27 applies a logarithmic law to the amplitude of the signal received, amplified and filtered, which enables a reduction of the range of possible values of the amplitude of the signal received by the receiver module 12.

Furthermore, the control module 10 comprises an analog-to-digital converter 28 which converts the signal at output of the circuit 27 into a digital signal, the digital signal being applied to the input of a microcontroller 26 which analyses the amplitude of the digitized signal received with a view to controlling the vibrator 18 and the display 17, as well as the gain of the stage 24, to all of which it is connected. The microcontroller 26 is controlled by a program stored in a non-volatile internal memory 29, which monitors the sequencing of the operations of the method represented in FIG. 3.

When an avalanche occurs, the rescue workers equipped with the device start searching for the avalanche victims. To this end, they activate the receiver function of the device by means of the selector 16, and carry out the search by methodically covering the zone snowed in by the avalanche.

Figure 3:
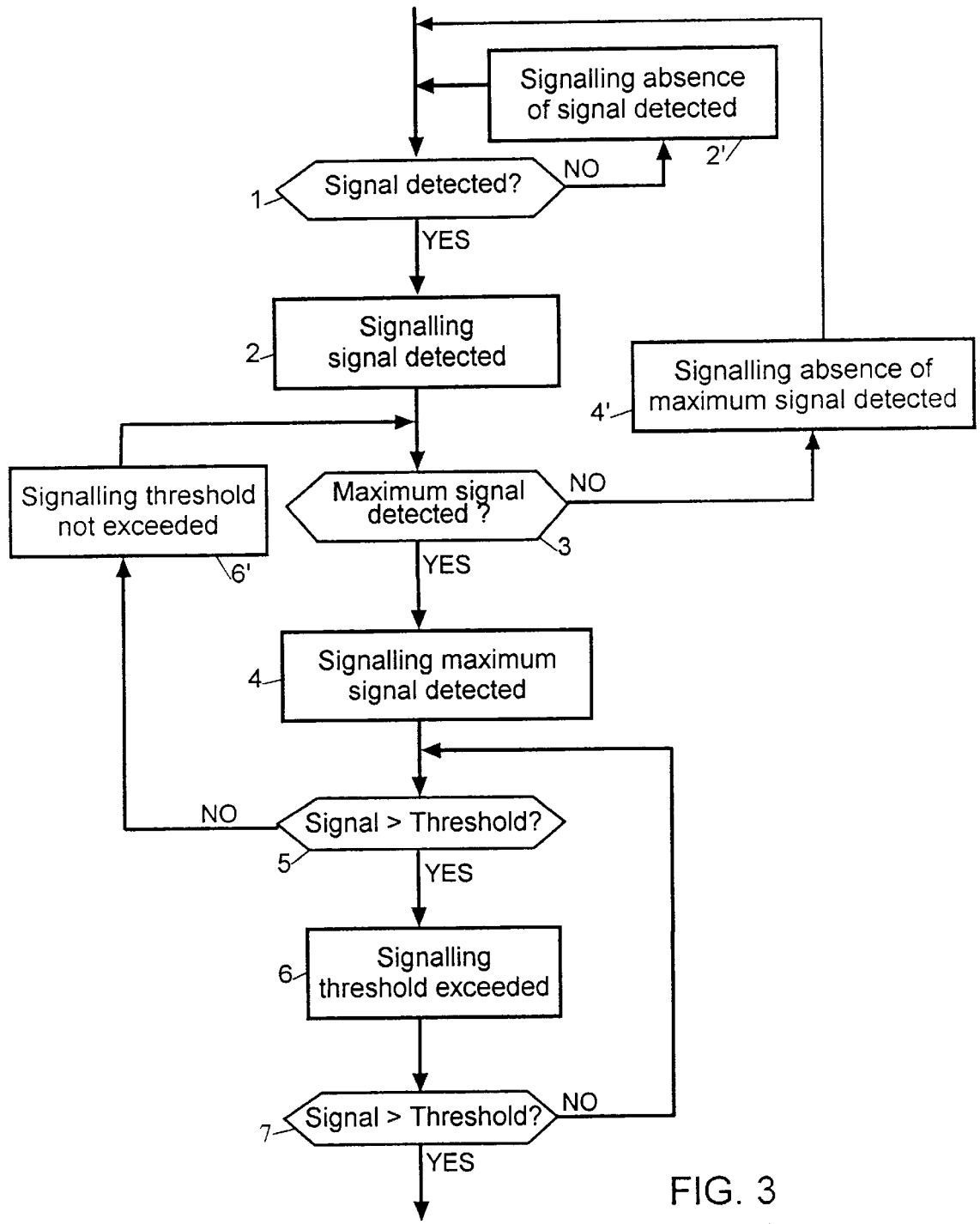
FIG. 3 shows, in the form of a block diagram, the concatenation of the different phases of the method according to the invention.

When the receiver module 12 is activated by means of the switch 16, the microcontroller 26 adjusts the gain of the amplifier stage 24 so as to obtain maximum sensitivity. In FIG. 3, the method according to the invention then comprises a phase consisting in detecting one or more signals transmitted by the devices worn by the avalanche victims. During this phase, the signal received by the receiver module 12 of the device is compared, by the microcontroller 26, to a lower threshold above the natural noise level, which can be computed as a function of the amplitude of natural noise (stage 1). When the signal received exceeds this lower threshold, the microcontroller 26 triggers the transmission of an optical and/or audible signal, by means of the vibrator 18 and indicator lamps 17, to indicate this fact to the person carrying the device (stage 2). The transmission of the optical signal, which consists e.g. in lighting the indicator lamp 19, can be maintained as long as the signal received exceeds this lower threshold.

The audible signal can e.g. consist in two 3-second bleeps spaced one second apart.

This optical and/or audible signal indicates to rescue workers that they must swivel around, holding the device horizontally, while the latter analyses the amplitude of the signal received in order to detect a maximum (stage 3). When this maximum has been detected, the microcontroller 26 triggers the transmission of a new optical and/or audible signal, e.g. by lighting the indicator lamp 20, so as to indicate to the rescue worker that the device is pointed in the direction of a victim (stage 4).

During the search for the victim's direction, the microcontroller 26 can command transmission, to the vibrator 18, of an audible signal of low frequency which varies as a function of the amplitude of the signal received.

During this search, the micro-controller can, of course, continue to monitor the presence of a signal (stage 2) and to control the lamp 19 (stages 2 and 2') depending on whether or not a signal is present.

When it has detected that the signal received has passed through the maximum amplitude, the microcontroller 26 can further provide the rescue worker with an indication of the distance separating him from the victim, by controlling the selective lighting of a strip of light emitting diodes each associated with a distance, or by displaying the distance by means of a digital display with twice seven segments.

This distance value is computed as a function of the amplitude of the signal received, e.g. by means of a table stored in the memory 29, establishing a correspondence between the possible values of the amplitude of the signal received and distance values.

When the microcontroller 26 has indicated to the rescue worker that the signal has reached its maximum, the rescue worker must then head in the direction indicated by the orientation of the device at the moment the maximum amplitude was detected. During this movement, the microcontroller 26 continues to search for the maximum signal to check that the rescue worker is indeed moving in the direction indicated and automatically makes the necessary gain corrections as it goes along so that the amplitude of the signal remains within the sensitivity range of the measuring means of the device, and particularly of the converter 28. Should the amplitude of the signal received decrease, the lamp 20 indicating that the victim's direction has been detected goes out (stage 4'), possibly accompanied by a special audible signal, and stages 1 to 3 must be recommenced.

Thus, the rescue worker is guided along a channel leading to the victim wearing the device in the transmission position.

It so happens that the pattern of the electromagnetic field is in the shape of an oval of which the radius is located on the axis of the transmission coil. As a result, in order to remain on a field line, the rescue worker must follow a curved path to remain on the same field line with the maximum amplitude, and this is particularly delicate in the absence of real-time control of the direction the rescue worker is moving in.

The search for the maximum values reached by the amplitude of the signal received is performed e.g. by determining the direction in which it develops, be it constant, ascending or descending, which can be obtained by memorizing the value of the amplitude measured beforehand, and by comparing the last measured value with the memorized value. To determine at what moments the amplitude of the signal received reaches its maximum value, one need simply detect that the amplitude is starting to move in the direction of decrease after having been either constant or on the increase.

As the rescue worker advances in the direction indicated by the microcontroller 26, the latter also compares the amplitude of the signal received with an upper threshold which is exceeded when the rescue worker finds himself close to the place where the victim wearing the device in the transmitter position (stage 5) is buried. When this threshold is exceeded, the device notifies the rescue worker by lighting an indicator lamp 21 provided for this purpose, and by emitting an audible signal e.g. for a 10-second duration (stage 6).

This signaling tells the rescue worker that he is e.g. within three meters of the victim.

As long as the rescue worker has not brought the search to an end (stage 7), the microcontroller 26 continues to analyze the signal received in order to determine whether its amplitude is increasing or decreasing, with a view to advising the rescue worker as to whether or not the amplitude of the signal received has reached a maximum and whether or not it has exceeded the upper threshold, and continues to control the lighting and extinction of the corresponding lamps 19, 20, 21 (stages 3, 4, 4', 5, 6, 6' and 7). In this manner, the rescue worker can accurately determine the position of the victim by methodically covering a zone of limited area (less than three meters in diameter) in which the amplitude of the signal received exceeds the upper threshold, while being informed, by means of the direction lamp, of all places in which the amplitude of the signal received reaches a maximum value. When the victim has been accurately located, the rescue worker can then start digging him out with a shovel.

According to one feature of the invention, stage 2 is followed by a phase involving learning and synchronization with the signal received by the receiver module 12, so as to avoid any interference to the device by the signals emitted by the transmitters worn by other victims. In fact, with avalanches, there are often several victims buried under the snow and each having a transmitter operating in accordance with the international transmission standard for devices for the location of avalanche victims.

The standard stipulates that the transmission must be at 457 kHz with 100% amplitude modulation. Each pulse emitted is defined by a duration included between 70 ms and 1.1 s, with a period included between 0.5 and 1.3 s.

Figure 4:
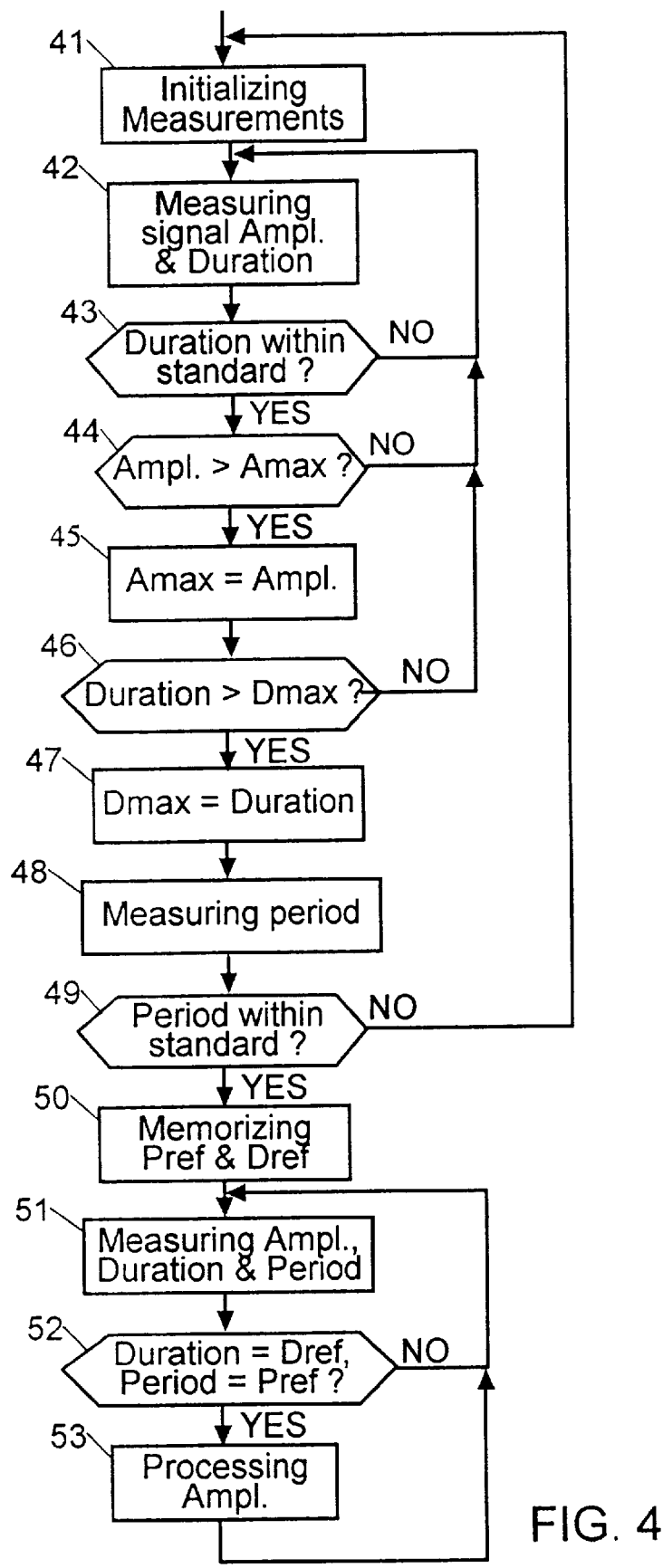
FIG. 4 represents, in block diagram form, the concatenation of the different stages of the learning and synchronization phase according to the invention.

In FIG. 4. when the receiver function is activated, the microcontroller 26 initializes the different measurements it memorized previously (stage 41).

After detecting the presence of a victim, the microcontroller 26, which constantly receives the filtered and digitized signal received, switches into the learning and synchronization phase. To this end, it performs amplitude and duration measurements on each pulse of the signal received (stage 42) and checks, during stages 43, 44 and 46, that the duration of the pulses complies with the standard (included between 70 ms and 1.1 s), and that the amplitude and duration of the pulses measured either remain constant or increase, As long as the signal received is not in compliance, the microcontroller 26 repeats stages 42 to 46. Once the signal is in compliance, the microcontroller 26 memorizes the maximum values Amax and Dmax of the amplitude and duration (stages 45 and 47), synchronizes its time base with the start of reception of each pulse of the signal received (stage 48), and checks the recurrence of this signal over several periods. If, at stage 49, the period fails to comply with the standard (included between 0.5 and 1.3 s), the microcontroller 26 repeats stages 41 to 49. Otherwise, the microcontroller 26 synchronizes itself with this signal, only taking into account the measurements it receives during the duration Dmax (stage 51). Throughout the remainder of the search (stages 52 and 53), it checks that all the measurements taken into account are valid, i.e. that they are within the predefined windows, and if these values do prove valid, it updates the characteristics of the reception window in order to perfect the synchronism between the transmitter of the victim being sought and the receiver. If, temporarily, the measurements are not valid, it keeps the previous windows. If, during three successive periods, the microcontroller 26 no longer detects the synchronized transmitter, it cancels the reception window values and returns to the sequence of learning (stage 41) the characteristics of the most powerful signal received.

The rescue worker is thus guided towards a single victim and, once he has assisted the latter, will then be able to rescue other victims.

According to another embodiment of the invention, when the upper threshold is exceeded (stages 5 to 7), the microcontroller 26 triggers the transmission of an audible signal by sending to the vibrator 18 a signal in the form of bleeps the frequency of transmission of which varies as a function of the amplitude of the signal received. The transmission frequency of these bleeps is e.g. 2 Hz when the amplitude of the signal received corresponds to a distance between the rescue worker and the victim of about 5 m. The microcontroller 26 increases this frequency progressively as the amplitude of the received signal increases and the rescue worker thus comes nearer to the victim, until a continuous audible signal is transmitted when the distance between the rescue worker and the victim is less than 0.5 m.

Figure 5:
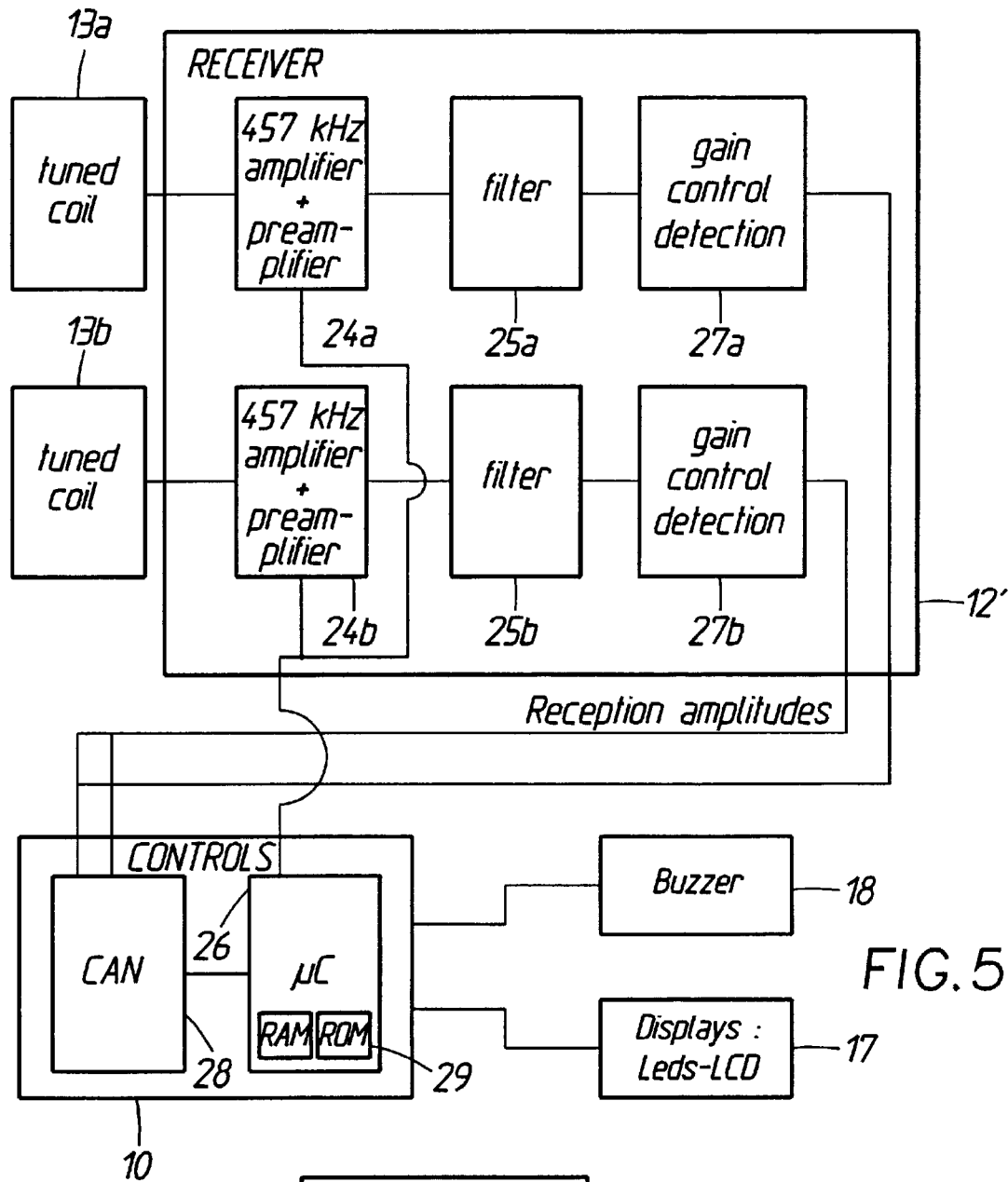
FIG. 5 schematically represents the synopsis of another embodiment of the device in FIG. 2.

According to another embodiment of the invention represented in FIG. 5, the receiver device 12' is connected to two tuned coils 13a and 13b arranged in a "V" in relation to one another. It comprises two preamplification and amplification stages 24a, 24b respectively connected to the two tuned coils 13a, 13b, two bandpass filtering circuits 25a, 25b centered on the standardized frequency of 457 kHz and respectively connected to the output of the stages 24a, 24b, and two signal detection and gain control circuits 27a, 27b applied to the amplitude of the signals coming from the filtering circuits 25a, 25b.

Thus, the receiver circuit 12' supplies the control module 10 with two amplitude signals corresponding to the signals received by the coils 13a, 13b.

By comparing the amplitude of the signals received by the coils 13a, 13b during stage 3, the computing module can determine the direction in which the rescue worker's device must be rotated during the directional search for the victim. In this way, if, for instance, the left-hand coil receives the strongest signal, the victim will be located to the left. When the two coils receive a signal of the same amplitude, this means that the victim's device is in the direction in which the two coils 13a, 13b are pointed, corresponding to the direction of the inner bisecting line of the angle formed by the two coils. The relationship between the amplitude of the signals received by the two coils thus varies as a function of the angle between the direction in which the victim's device is pointed and the direction pointed to by the two-coil set. This relationship is used to drive a direction indicator, e.g. a pivoting arrow or a set of light emitting diodes arranged in an arc of a circle, during stages 2, 4 and 4'.

In this embodiment, only one of the two coils (13a, 13b) is used to transmit.

Furthermore, it should be noted that in the case of the coils (13a, 13b) not being pointed in the direction of the victim, the distance indication, which is computed as a function of the amplitude of the signal received, is meaningless. To remedy this drawback, the calculation of the distance takes into account the relationship between the amplitudes of the signals received by the two coils.

Figure 6:
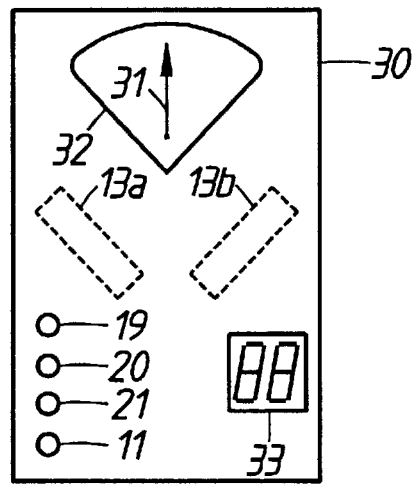
FIG. 6 represents the box of the device according to the other embodiment in FIG. 5.

FIG. 6 represents the box 30 of the device embodying the invention, this box housing the two coils 13a, 13b arranged in a "V" in relation to one another, and comprising:

a dial 32 comprising a pivoting arrow 31 whose central position corresponds to the inner bisecting line of the angle formed by the two coils 13a, 13b, the indicator lamps 11 and 19 to 21, a digital display 33 with twice seven segments.

The two coils are arranged so that they form an angle situated e.g. in the region of 90°.

I claim:

1. A method for guiding a rescue worker, carrying a radio receiver device for receiving signals at a standardized frequency, searching for an avalanche victim wearing a radio transmitter device continually transmitting signals in the form of electromagnetic waves at said standardized frequency, said signals received by said receiver device being analyzed by a processor coupled to receiving means of said receiver device, the method comprising successively:

a detection phase consisting in detecting presence of the transmitter device worn by the victim, during which the rescue worker methodically covers the zone snowed in by the avalanche with said receiver device, this phase comprising comparing amplitude of signals received by the receiver device with a lower threshold, and controlling a first signaling means to indicate to the rescue worker whether or not the signals received exceeds the lower threshold, a directional search phase consisting of a directional searching for the victim, during which the rescue worker rotates the receiver device about a substantially vertical axis, this phase comprising measuring the amplitudes of the signals received by said receiver device in at least two directions, comparing said amplitudes with one another to determine a victim direction, and controlling a second signaling means to indicate to the rescue worker whether or not said receiver device is in a victim direction, in order to indicate the rescue worker whether or not he is headed in the victim direction, an advancing phase consisting in the rescue worker advancing towards the victim, comprising measuring the amplitudes of the signals received to determine whether or not said receiver device is in said victim direction, while controlling said second signaling means, comparing the amplitude of the signal received with an upper threshold, and controlling a third signaling means to indicate the rescue worker whether or not the signal received exceeds the upper threshold.

2. The method as claimed in claim 1, wherein the detection phase further comprises automatic setting sensitivity of the receiver device to a maximum, while the directional search and advancing phases comprise automatic setting the sensitivity of the receiver device in order for the amplitude of the signals received to remain within a predetermined range of values.

3. The method as claimed in claim 1, further comprising subsequent to the transmitter device detection phase, a synchronization and learning phase during which the receiver device synchronizes itself with the signals received and determines a periodic time window in which said signals are received, said directional search and advancing phases only taking measurements during this periodic time window.

4. The method as claimed in claim 1, wherein the directional search and advancing phases further comprise determining a direction in which the receiver device must be rotated, and indicating to the rescue worker this direction of rotation.

5. The method as claimed in claim 4, further comprising determining an angle formed by a direction in which the receiver device is pointed and the direction of the transmitter device worn by the victim, and indicating to the rescue worker a value of this angle.

6. The method as claimed in claim 1, further comprising a phase consisting in accurately locating the victim, during which the rescue worker methodically covers the zone in which the signal received exceeds the upper threshold, this phase comprising analyzing the signals received, in order to determine at what instants the amplitude of said signals exceeds the upper threshold and at what instants said amplitude reaches a maximum value, and controlling the second and third signaling means depending on whether or not the amplitude of the signals received reaches a maximum value and whether or not it exceeds the upper threshold.

7. The method as claimed in claim 1, wherein the determination of the victim direction comprises determining instants at which the amplitude of the signals received reaches a maximum value by comparing said amplitude with a previous value thereof, the amplitude of the signals received being deemed maximum when it starts to decrease after having increased or been constant.

8. The method as claimed in claim 1, further comprising transmitting audible signals at instants at which the amplitude of the signals received exceeds the lower threshold, reaches a maximum value and decreases, as well as at instants at which it exceeds the upper threshold.

9. The method as claimed in claim 1, further comprising determining a distance between the receiver device and the transmitter device as a function of the amplitude of the signals received, as well as indicating to the rescue worker the value of said distance.

10. The method as claimed in claim 1, further comprising determining a distance between the receiving device and the transmitting device as a function of the amplitude of the received signals, and indicating to the rescue worker a value of said distance by the transmission of bleeps having a transmission frequency varying as a function of said value.

11. A device for guiding a rescue worker towards an avalanche victim, comprising:

a transmitter device worn by the avalanche victim and comprising a transmitter module transmitting signals at the standardized frequency, a receiver device carried by the rescue worker and comprising a receiver module designed to receive the signals transmitted by the transmitter device worn by the victim, signaling means and a computing and control module connected to an output of the receiver module and to said signaling means in order to control the signaling means as a function of amplitude of the signals received by the receiver module, said computing and control module comprising means for measuring the amplitude of the signals received, means for comparing said amplitude with predetermined lower and higher thresholds and for controlling the signaling means to indicate a value of said amplitude with respect to said thresholds, means for determining a victim direction using at least two amplitudes of the signals received in two respective directions and for controlling said signaling means to indicate whether or not said receiver device is in the victim direction.

12. The device as claimed in claim 11, wherein the receiver module comprises a stage of preamplification and amplification of the signal received by at least a coil tuned to the standardized frequency, a bandpass filtering means centered on the standardized frequency to filter the signal coming from said stage, and a signal detection and gain control circuit which receives, at input, the signal coming from said filtering means in order to apply a logarithmic function thereto.

13. The device as claimed in claim 12, further comprising an analog-to-digital converter for converting the signal coming from the detection and gain control circuit into a digital signal which is applied to an input of the computing and control module.

14. The device as claimed in claim 12, wherein the computing and control module comprises a means for controlling a gain applied to the signals received by the preamplification and amplification stage.

15. The device as claimed in claim 11, wherein the receiver module is connected to two tuned coils and comprises two signal processing chains respectively connected to the tuned coils, each of said two chains comprising a preamplification and amplification stage, a filtering circuit and a signal detection and gain control circuit, these two sequences providing the computing module with two signals representative of the amplitudes of the signals received by the two coils.

16. The device as claimed in claim 11, further comprising an audible and an optical signaling means controlled by the computing module as a function of the amplitude of the signal received, the optical means comprising:

a first lamp indicating that a signal, at the standardized frequency and having an amplitude exceeding the lower threshold, has been received by the receiver module, a second lamp indicating that the amplitude of the signal received is at a maximum value, and a third lamp indicating that the amplitude of the signal received is in excess of the upper threshold.

17. The device as claimed in claim 11, wherein the computing module comprises a microcontroller controlled by a program stored in a non-volatile memory, for analyzing the signal received and digitized by an analog-to-digital converter, and for controlling a gain of a preamplification and amplification stage and the signaling means.

18. The device as claimed in claim 11, wherein the avalanche victim wears a device identical to that of the rescue worker, said device comprising a selector enabling the transmitter module or the receiver module to be activated alternately.

19. The device as claimed in claim 11, wherein the receiver device worn by the rescue worker comprises a strip of light emitting diodes or a digital display indicating a distance separating him from the avalanche victim and computed as a function of the amplitude of the signals received.

20. The method as claimed in claim 1, comprising simultaneously measuring the amplitudes of signals received by said receiver device in two predetermined different directions with respect to a direction pointed by said receiver device, the victim direction with respect to the direction pointed by said receiver device being determined as a function of a relationship between said amplitudes.

* * * * *